US012477732B2

(12) United States Patent
Hopkins et al.

(10) Patent No.: US 12,477,732 B2
(45) Date of Patent: Nov. 18, 2025

(54) MEMORY ARRAYS COMPRISING STRINGS OF MEMORY CELLS AND METHODS USED IN FORMING A MEMORY ARRAY COMPRISING STRINGS OF MEMORY CELLS

(71) Applicant: Micron Technology, Inc., Boise, ID (US)

(72) Inventors: John D. Hopkins, Meridian, ID (US); Damir Fazil, Boise, ID (US); Jordan D. Greenlee, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 684 days.

(21) Appl. No.: 17/896,570

(22) Filed: Aug. 26, 2022

(65) Prior Publication Data
US 2024/0074179 A1   Feb. 29, 2024

(51) Int. Cl.
*H10B 43/27* (2023.01)
*H10B 41/27* (2023.01)

(52) U.S. Cl.
CPC .............. *H10B 43/27* (2023.02); *H10B 41/27* (2023.02)

(58) Field of Classification Search
CPC ........ H10B 43/00–50; H10B 41/00–70; G11C 16/0466–0475; G11C 27/005; G11C 11/5671; G11C 16/0408–0458; G11C 16/0483; G11C 11/5621–5642; G11C 2216/06–10
See application file for complete search history.

(56) References Cited

U.S. PATENT DOCUMENTS

| | | | |
|---|---|---|---|
| 2021/0280595 A1* | 9/2021 | Hopkins | H10B 41/27 |
| 2021/0280691 A1* | 9/2021 | Hopkins | H10B 43/27 |
| 2021/0358928 A1* | 11/2021 | Hopkins | H10B 43/10 |

OTHER PUBLICATIONS

Schott et al. "Blocking of Silicon Oxidation by Low-Dose Nitrogen Implantation", Appl. Phys. A, vol. 45, 1988, Germany, pp. 73-76.

* cited by examiner

*Primary Examiner* — Christine S. Kim
*Assistant Examiner* — Cole Leon Lindsey
(74) *Attorney, Agent, or Firm* — Wells St. John P.S.

(57) ABSTRACT

A memory array comprising strings of memory cells comprises a conductor tier comprising conductor material. Laterally-spaced memory blocks individually comprise a vertical stack comprising alternating insulative tiers and conductive tiers directly above the conductor tier. Channel-material strings of memory cells extend through the insulative tiers and the conductive tiers. The channel material of individual of the channel-material strings is directly electrically coupled to the conductor material of the conductor tier. Intervening material is laterally-between and longitudinally-along immediately-laterally-adjacent of the memory blocks. The intervening material comprises insulating material. The conductor material in the conductor tier comprises a pair of side interfaces that individually extend downwardly from a top of the conductor tier on one of opposing sides of the intervening material and individually extend longitudinally-along the immediately-laterally-adjacent memory blocks. The side interfaces have the conductor material laterally-over opposing sides thereof. Other embodiments, including method, are disclosed.

25 Claims, 16 Drawing Sheets

MEMORY ARRAYS COMPRISING STRINGS OF MEMORY CELLS AND METHODS USED IN FORMING A MEMORY ARRAY COMPRISING STRINGS OF MEMORY CELLS

TECHNICAL FIELD

Embodiments disclosed herein pertain to memory arrays comprising strings of memory cells and to methods used in forming a memory array comprising strings of memory cells.

BACKGROUND

Memory is one type of integrated circuitry and is used in computer systems for storing data. Memory may be fabricated in one or more arrays of individual memory cells. Memory cells may be written to, or read from, using digitlines (which may also be referred to as bitlines, data lines, or sense lines) and access lines (which may also be referred to as wordlines). The sense lines may conductively interconnect memory cells along columns of the array, and the access lines may conductively interconnect memory cells along rows of the array. Each memory cell may be uniquely addressed through the combination of a sense line and an access line.

Memory cells may be volatile, semi-volatile, or non-volatile. Non-volatile memory cells can store data for extended periods of time in the absence of power. Non-volatile memory is conventionally specified to be memory having a retention time of at least about 10 years. Volatile memory dissipates and is therefore refreshed/rewritten to maintain data storage. Volatile memory may have a retention time of milliseconds or less. Regardless, memory cells are configured to retain or store memory in at least two different selectable states. In a binary system, the states are considered as either a "0" or a "1". In other systems, at least some individual memory cells may be configured to store more than two levels or states of information.

A field effect transistor is one type of electronic component that may be used in a memory cell. These transistors comprise a pair of conductive source/drain regions having a semiconductive channel region therebetween. A conductive gate is adjacent the channel region and separated therefrom by a thin gate insulator. Application of a suitable voltage to the gate allows current to flow from one of the source/drain regions to the other through the channel region. When the voltage is removed from the gate, current is largely prevented from flowing through the channel region. Field effect transistors may also include additional structure, for example a reversibly programmable charge-storage region as part of the gate construction between the gate insulator and the conductive gate.

Flash memory is one type of memory and has numerous uses in modern computers and devices. For instance, modern personal computers may have BIOS stored on a flash memory chip. As another example, it is becoming increasingly common for computers and other devices to utilize flash memory in solid state drives to replace conventional hard drives. As yet another example, flash memory is popular in wireless electronic devices because it enables manufacturers to support new communication protocols as they become standardized, and to provide the ability to remotely upgrade the devices for enhanced features.

NAND may be a basic architecture of integrated flash memory. A NAND cell unit comprises at least one selecting device coupled in series to a serial combination of memory cells (with the serial combination commonly being referred to as a NAND string). NAND architecture may be configured in a three-dimensional arrangement comprising vertically-stacked memory cells individually comprising a reversibly programmable vertical transistor. Control or other circuitry may be formed below the vertically-stacked memory cells. Other volatile or non-volatile memory array architectures may also comprise vertically-stacked memory cells that individually comprise a transistor.

Memory arrays may be arranged in memory pages, memory blocks and partial blocks (e.g., sub-blocks), and memory planes, for example as shown and described in any of U.S. Patent Application Publication Nos. 2015/0228651, 2016/0267984, and 2017/0140833. The memory blocks may at least in part define longitudinal outlines of individual wordlines in individual wordline tiers of vertically-stacked memory cells. Connections to these wordlines may occur in a so-called "stair-step structure" at an end or edge of an array of the vertically-stacked memory cells. The stair-step structure includes individual "stairs" (alternately termed "steps" or "stair-steps") that define contact regions of the individual wordlines upon which elevationally-extending conductive vias contact to provide electrical access to the wordlines.

DETAILED DESCRIPTION OF EXAMPLE EMBODIMENTS

Embodiments of the invention encompass methods used in forming a memory array, for example an array of NAND or other memory cells having peripheral control circuitry under the array (e.g., CMOS-under-array). Embodiments of the invention encompass so-called "gate-last" or "replacement-gate" processing, so-called "gate-first" processing, and other processing whether existing or future-developed independent of when transistor gates are formed. Embodiments of the invention also encompass a memory array (e.g., NAND architecture) independent of method of manufacture. Example method embodiments are first described with reference to FIGS. 1-29 which may be considered as "gate-last" or "replacement-gate" processing. Further, and regardless, the following sequence of processing steps is but one example and other sequences of the example processing steps (with or without other processing steps) may be used regardless of whether using "gate-last/replacement-gate" processing.

Figure 1:
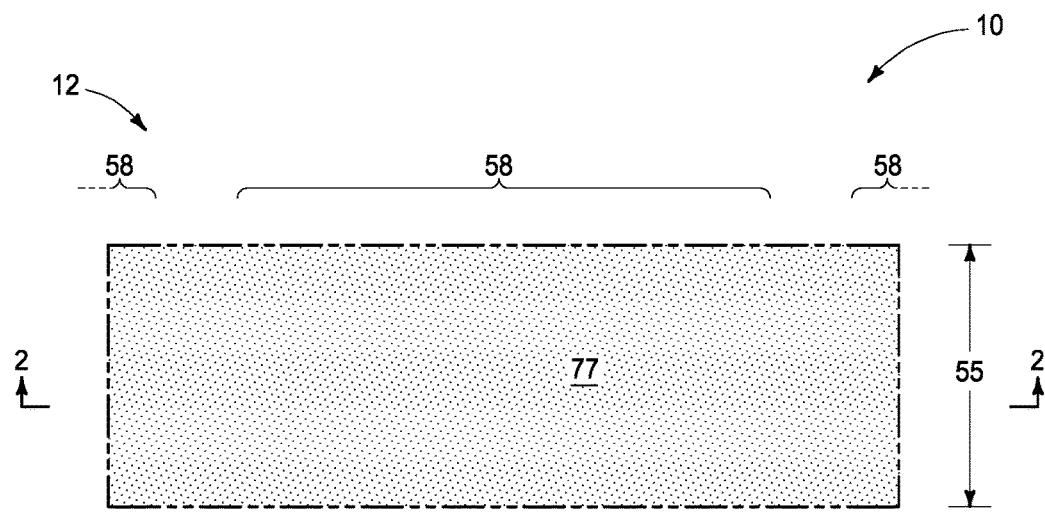
FIGS. 1 and 2 are diagrammatic cross-sectional views of portions of a construction that will comprise an array of elevationally-extending strings of memory cells in accordance with an embodiment of the invention.
Figure 2:
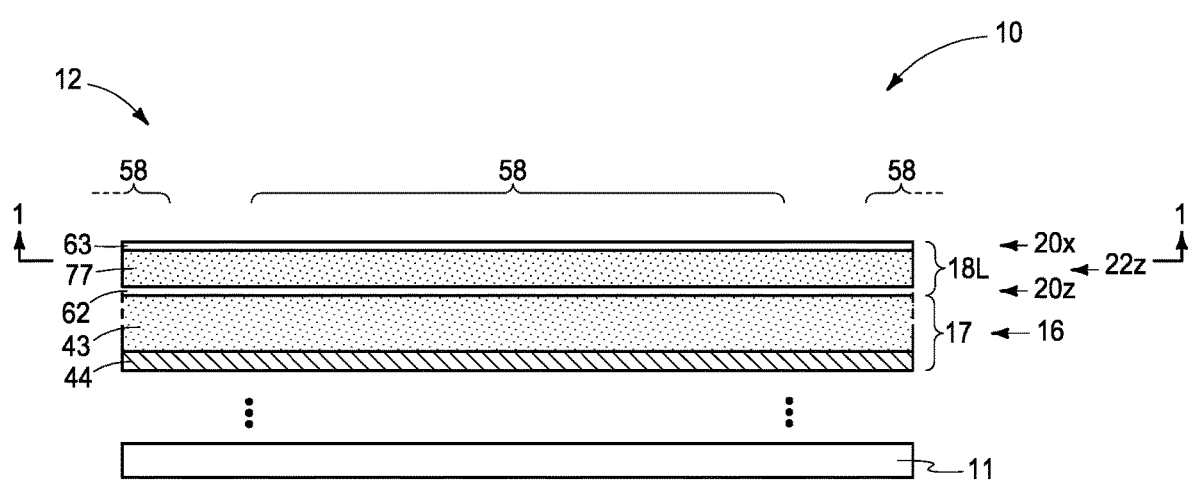

FIGS. 1 and 2 show a construction 10 having an array or array area 12 in which elevationally-extending strings of transistors and/or memory cells will be formed. Construction 10 comprises a base substrate 11 having any one or more of conductive/conductor/conducting, semiconductive/semiconductor/semiconducting, or insulative/insulator/insulating (i.e., electrically herein) materials. Various materials have been formed elevationally over base substrate 11. Materials may be aside, elevationally inward, or elevationally outward of the FIGS. 1 and 2-depicted materials. For example, other partially or wholly fabricated components of integrated circuitry may be provided somewhere above, about, or within base substrate 11. Control and/or other peripheral circuitry for operating components within an array (e.g., array 12) of elevationally-extending strings of memory cells may also be fabricated and may or may not be wholly or partially within an array or sub-array. Further, multiple sub-arrays may also be fabricated and operated independently, in tandem, or otherwise relative one another. In this document, a "sub-array" may also be considered as an array.

A conductor tier 16 comprising conductor material 17 that comprises conductively-doped polysilicon has been formed above substrate 11. Conductor material 17 as shown comprises upper conductor material 43 directly above and directly electrically coupled to (e.g., directly against) lower conductor material 44 of different composition from upper conductor material 43. An example upper conductor material 43 comprises conductively-doped polysilicon (e.g., n-type-doped or p-type-doped). An example lower conductor material 44 comprises metal material (e.g., a metal silicide such as $WSi_x$). Conductor tier 16 may comprise part of control circuitry (e.g., peripheral-under-array circuitry and/or a common source line or plate) used to control read and write access to the transistors and/or memory cells that will be formed in array 12.

A lower portion 18L of a stack 18* has been formed directly above conductor tier 16 and substrate 11 (an * being used as a suffix to be inclusive of all such same-numerically-designated components that may or may not have other suffixes). Stack 18* will comprise vertically-alternating conductive tiers 22* and insulative tiers 20*. Lower portion 18L and conductor tier 16 collectively comprise laterally-spaced memory-block regions 58 that will comprise laterally-spaced memory blocks 58 in a finished-circuitry construction. Memory-block regions 58 and resultant memory blocks 58 (not yet shown) may be considered as being longitudinally-elongated and oriented, for example horizontally-parallel relative one another along a direction 55.

Conductive tiers 22* (alternately referred to as first tiers) may not comprise conducting material and insulative tiers 20* (alternately referred to as second tiers) may not comprise insulative material or be insulative at this point in processing in conjunction with the hereby initially-described example method embodiment which is "gate-last" or "replacement-gate". In one embodiment, lower portion 18L comprises a lowest tier 20z of second tiers 20* directly above (e.g., directly against) conductor material 17. Example lowest second tier 20z is insulative and may be sacrificial (e.g., in array 12; e.g., comprising material 62, for example silicon dioxide and/or silicon nitride). In one embodiment, a next-lowest second tier 20x of second tiers 20* is directly above lowest second tier 20z and may be at least partially sacrificial (e.g., comprising material 63, for example silicon dioxide and/or silicon nitride). A lowest tier 22z of first tiers 22* comprising first sacrificial material 77 is vertically between lowest second tier 20z and next-lowest second tier 20x and comprises polysilicon.

In one embodiment, the polysilicon of first sacrificial material 77 contains oxidation-inhibitor material therein at a total concentration of at least $1\times10^{12}$ atoms/cm$^3$ to 20 atomic percent, with the oxidation-inhibitor material being at least one of N, C, Ga, B, O, Ge, As, Ti, W, Co, Mo, Hf, Zr, Ta, Ru, Cr, Ir, Pt, and P. Further in such embodiment, the total concentration of the oxidation-inhibitor material in the polysilicon of first sacrificial material 77 is greater than a total concentration of the oxidation-inhibitor material, if any, in conductively-doped polysilicon 43 of conductor tier 16. In some embodiments, the total concentration of the oxidation-inhibitor material in polysilicon 43 of first sacrificial material 77 is at least 0.5 atomic percent, in one embodiment is at least 1.0 atomic percent, and in one embodiment is no more than 5.0 atomic percent. In one embodiment, conductively-doped polysilicon 43 is devoid of the oxidation-inhibitor material and in an alternate embodiment comprises the oxidation-inhibitor material at least at $1\times10^{12}$ atoms/cm$^3$. In this document, "devoid" means from 0 atoms/cm$^3$ to less than $1\times10^{12}$ atoms/cm$^3$. In one embodiment where conductively-doped polysilicon 43 comprises the oxidation-inhibitor material at least at $1\times10^{12}$ atoms/cm$^3$, the conductivity-dopant that is in conductively-doped polysilicon 43 is P and the at least one in first sacrificial material 77 is devoid of P. In another embodiment where conductively-doped polysilicon 43 comprises the oxidation-inhibitor material at least at $1\times10^{12}$ atoms/cm$^3$, the at least one is P at least at $1\times10^{12}$ atoms/cm$^3$ and the conductivity-dopant in conductively-doped polysilicon 43 is P (but still with total concentration in first sacrificial material 77 being less than that in conductively-doped polysilicon 43). In one ideal embodiment, the at least one comprises N and/or C. In one embodiment, the at least one is only one and is devoid of all others of the at least one. In one embodiment, the at least one is more than one at a respective concentration of at least $1\times10^{12}$ atoms/cm$^3$. The oxidation-inhibitor material, when present, may be provided in the polysilicon of first sacrificial material 77 during deposition (e.g., in a precursor) or subsequently (e.g., by ion implantation, for example at an implant dose of $1\times10^{13}$ atoms/cm$^2$ to $1\times10^{17}$ atoms/cm$^2$).

Figure 3:
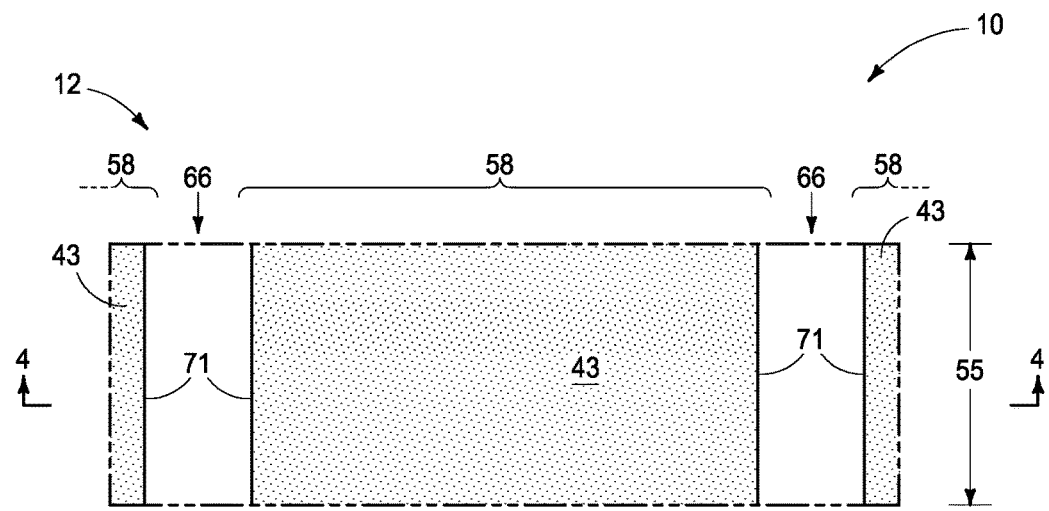
Figure 4:
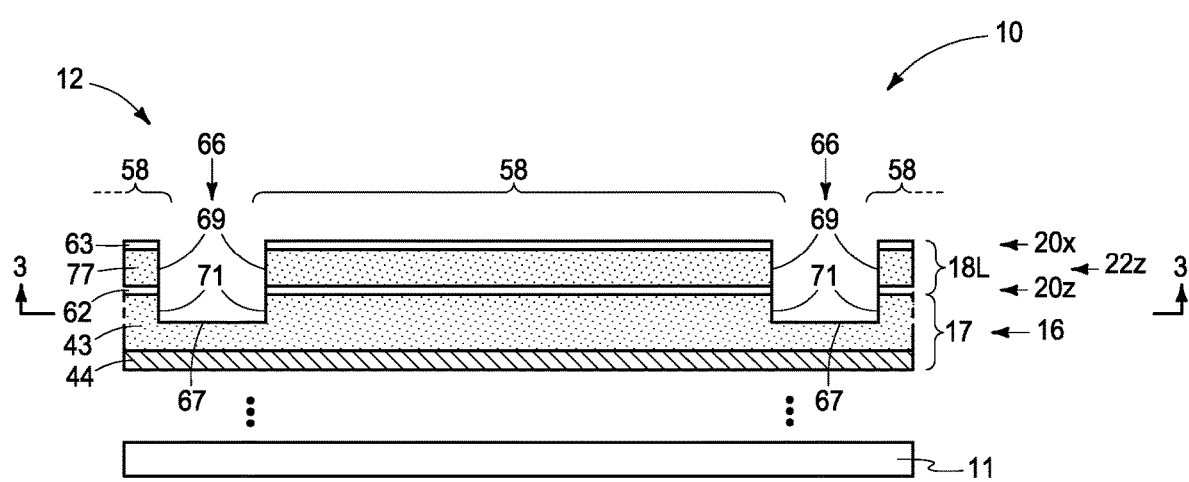

Referring to FIGS. 3 and 4, horizontally-elongated first trenches 66 have been formed through lower portion 18L and into conductively-doped polysilicon 43 of conductor tier 16, with first trenches 66 individually being between immediately-laterally-adjacent memory-block regions 58. First trenches 66 may taper laterally-inward or laterally-outward moving deeper into stack 18* (not shown). In one embodiment, individual first trenches 66 have a bottom 67 in and comprising conductively-doped polysilicon 43 of conductor tier 16. Alternately, first trenches 66 may go through conductively-doped polysilicon 43 and, if so, may go into lower conductor material 44 (neither being shown). Regardless, ideally first trenches are wider than the space that is laterally-between immediately-laterally-adjacent memory-block regions 58, thereby projecting laterally-into opposing sides thereof (as shown). First trenches 66 may be considered as comprising sidewalls 71 within conductor tier 16 and sidewalls 69 within lowest first tier 22z.

Figure 5:
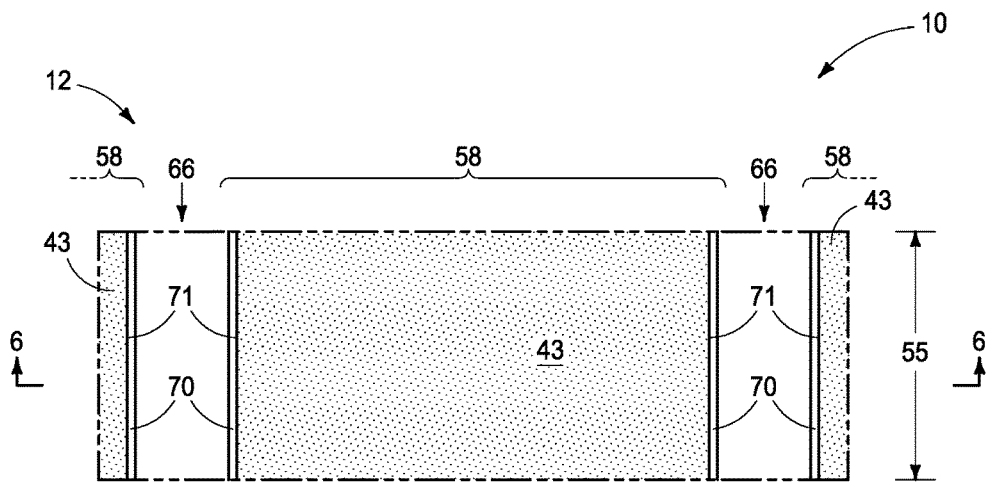
FIGS. 5-29 are diagrammatic sequential sectional and/or enlarged views of the construction of FIGS. 1 and 2, or portions thereof or alternate and/or additional embodiments, in process in accordance with some embodiments of the invention.
Figure 6:
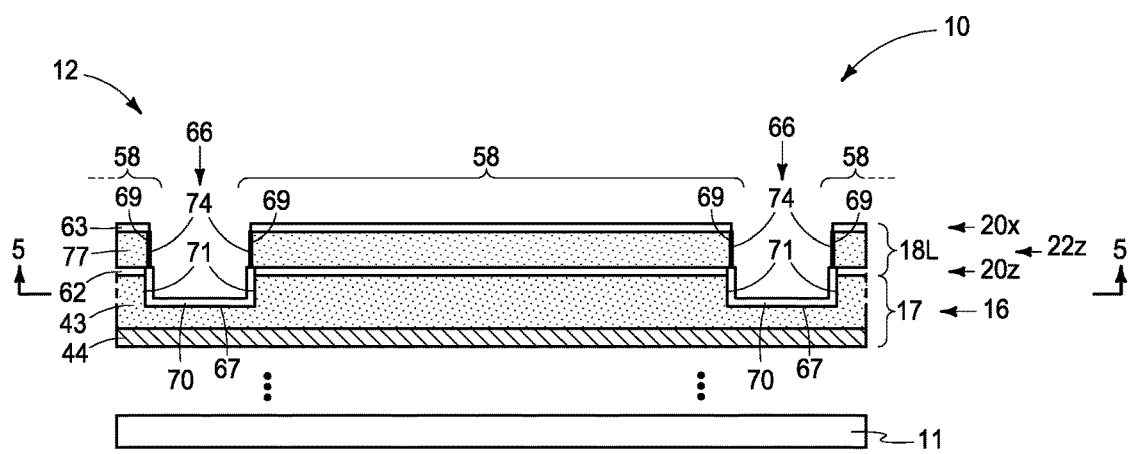
Figure 7:
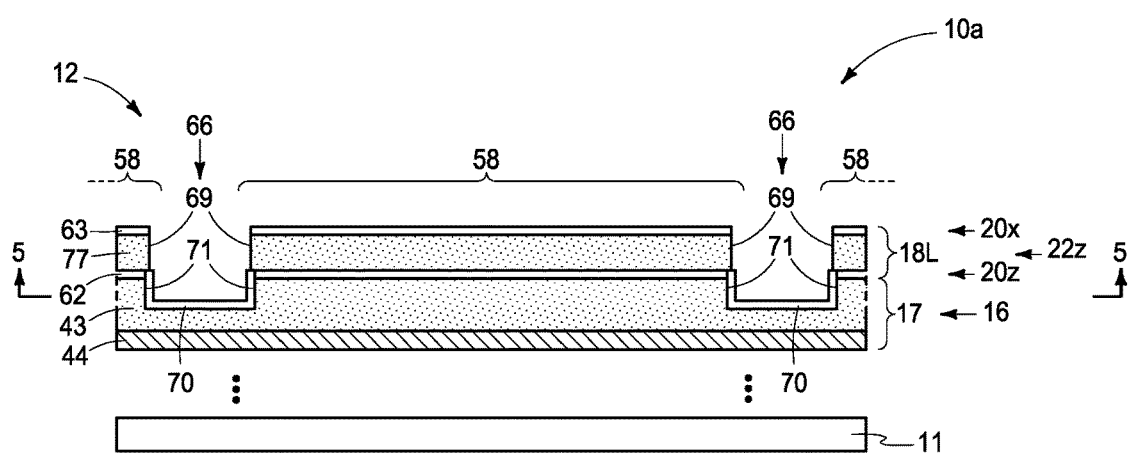

Referring to FIGS. 5 and 6, the polysilicon of the first sacrificial material 77 and conductively-doped polysilicon 43 of conductor tier 16 have been exposed to oxidizing conditions simultaneously (i.e., over at least some common period of time) to form silicon dioxide 70 over sidewalls 71 of first trenches 66 within conductor tier 16 to a greater thickness than silicon dioxide, if any, that is formed over sidewalls 69 of first trenches 66 within lowest first tier 22z. Example oxidizing conditions include 400° C. to 1,200° C.; 1 mTorr to 2 atmospheres; $O_2$, $O_3$, $H_2O$, and/or $NO_x$ as feed gas, and time period of 1 second to 20 hours. In one embodiment and as shown, the exposing forms silicon dioxide 74 over sidewalls 69 of first trenches 66 within lower first tier 22z. In another embodiment, the exposing doesn't form any silicon dioxide over sidewalls 69 of first trenches 66 within lower first tier 22z, for example as shown with respect to an alternate construction 10a in FIG. 7. Like numerals from the above-described embodiments have been used where appropriate, with some construction differences being indicated with the suffix "a" or with different numerals. Regardless, in one embodiment and as shown where individual first trenches 66 have a bottom 67 in and comprising conductively-doped polysilicon 43 of conductor tier 16, such exposing to the oxidizing conditions forms silicon dioxide 74 all across bottom 67 of first trenches 66.

Figure 8:
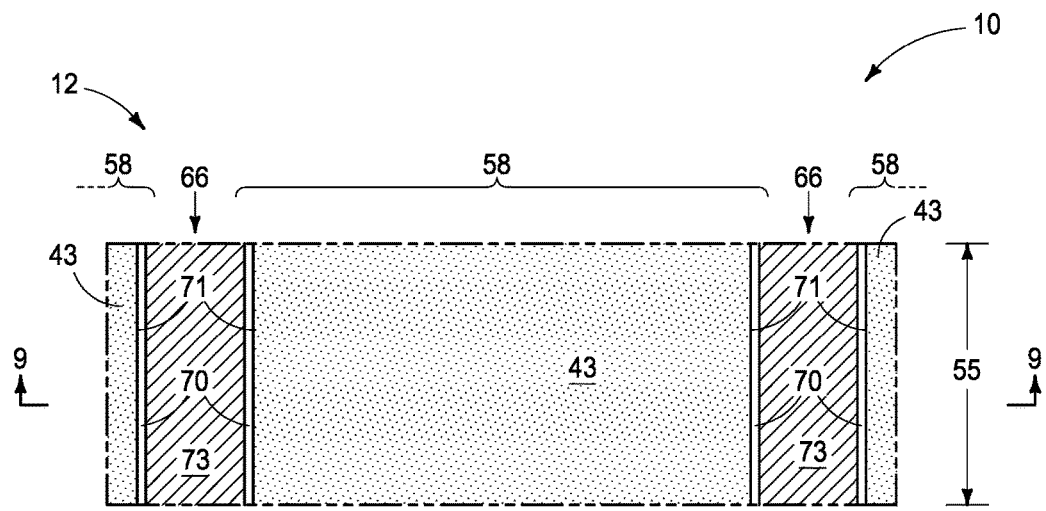
Figure 9:
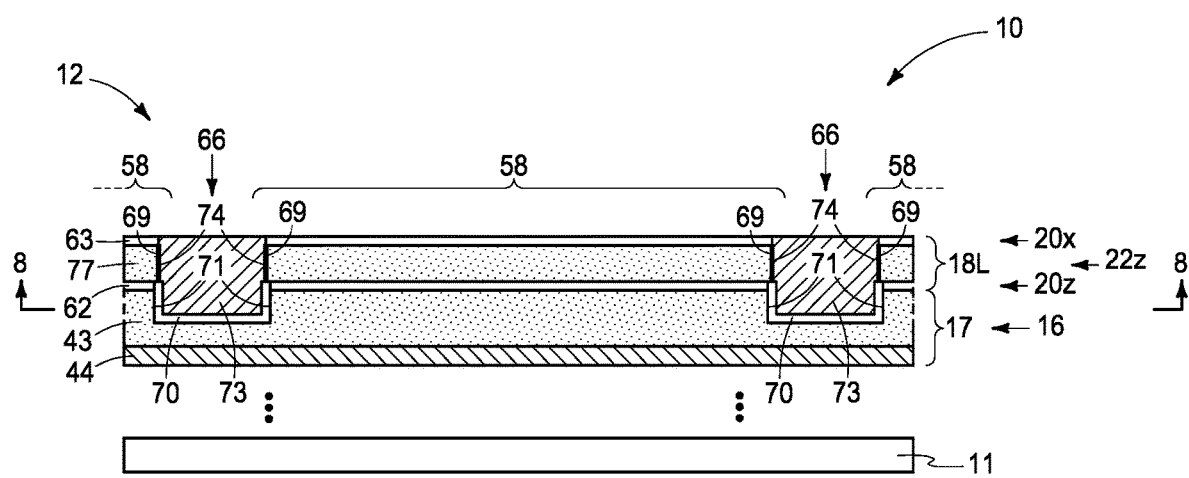
Figure 10:
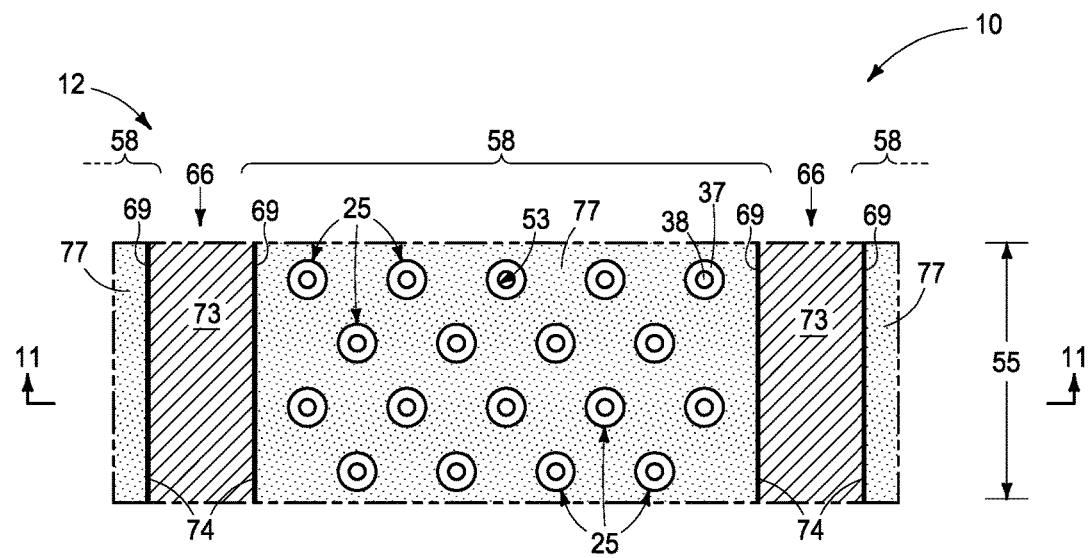
Figure 11:
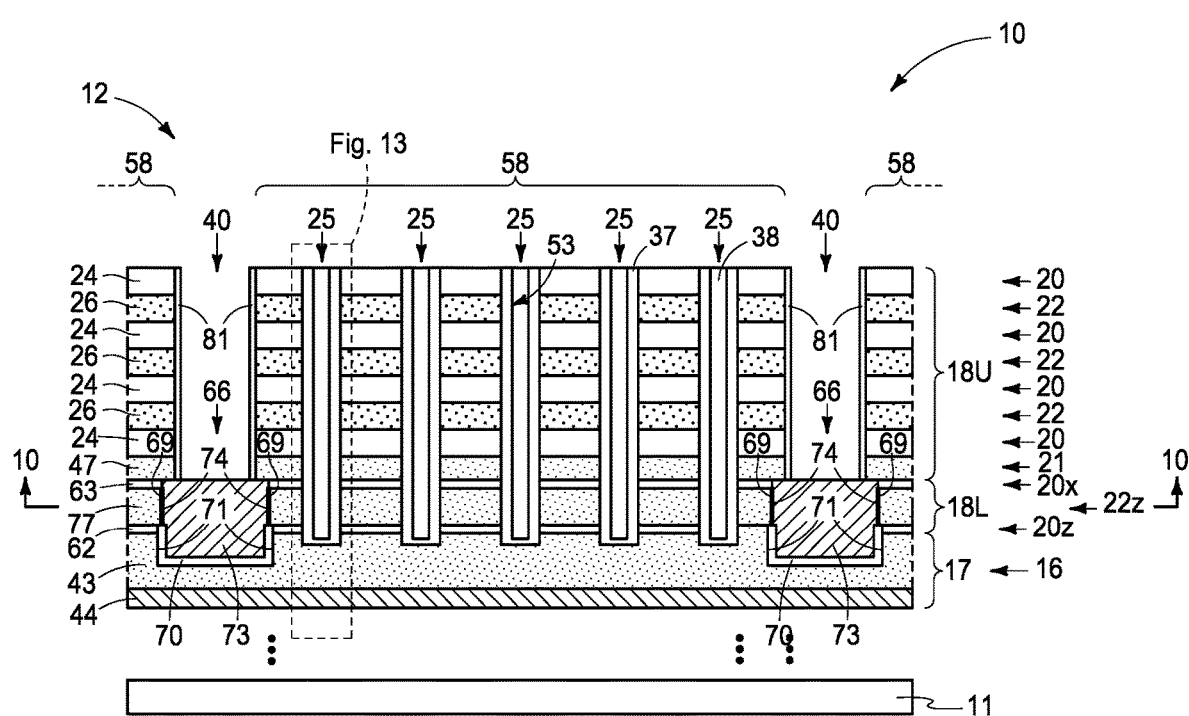
Figure 12:
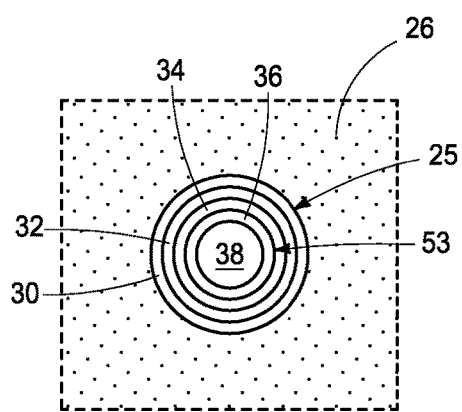
Figure 13:
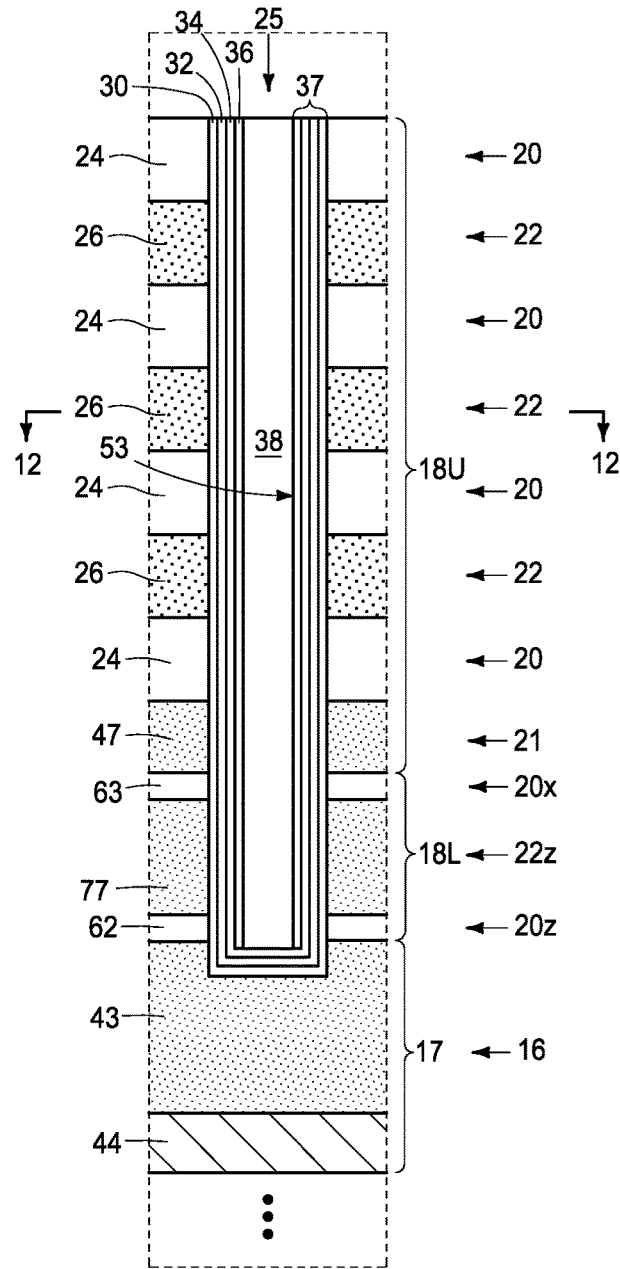

Referring to FIGS. 8 and 9, second sacrificial material 73 has been formed in first trenches 66 over silicon dioxide 74. Ideally, second sacrificial material 73 and first sacrificial material 77 are of different compositions relative one another, with an example second sacrificial material 73 being metal material (e.g., elemental tungsten inside of a TiN lining).

Referring to FIGS. 10-13, an upper portion 18U of stack 18\* has been formed directly above lower portion 18L and second sacrificial material 73. Example upper portion 18U comprises vertically-alternating different composition first tiers 22 and second tiers 20. First tiers 22 may be conductive and second tiers 20 may be insulative, yet need not be so at this point of processing in conjunction with the hereby-described example method embodiments which are "gate-last" or "replacement-gate". Example first tiers 22 and second tiers 20 comprise different composition materials 26 and 24, respectively (e.g., silicon nitride and silicon dioxide). Example upper portion 18U is shown starting above lower portion 18L with a conducting-material tier 21 comprising conducting material 47 (e.g., conductively-doped polysilicon) although such could alternately start with a second tier 20 or material 26 (neither being shown). Further, and by way of example, lower portion 18L may be formed to have one or more first and/or second tiers as a top thereof. Regardless, only a small number of tiers 20 and 22 is shown, with more likely upper portion 18U (and thereby stack 18\*) comprising dozens, a hundred or more, etc. of tiers 20 and 22. Further, other circuitry that may or may not be part of peripheral and/or control circuitry may be between conductor tier 16 and stack 18\*. By way of example only, multiple vertically-alternating tiers of conductive material and insulative material of such circuitry may be below a lowest of conductive tiers 22 and/or above an uppermost of conductive tiers 22. For example, one or more select gate tiers (not shown) may be between conductor tier 16 and the lowest conductive tier 22 and one or more select gate tiers may be above the uppermost of conductive tiers 22. Alternately or additionally, at least one of the depicted uppermost and lowest conductive tiers 22 may be a select gate tier.

Channel openings 25 have been formed (e.g., by etching) through second tiers 20 and first tiers 22 in upper portion 18U into first sacrificial material 77 in lower portion 18L (at least into). Channel openings 25 may taper radially-inward or radially-outward (not shown) moving deeper into stack 18. In some embodiments, channel openings 25 may go into conductor material 17 of conductor tier 16 as shown or may stop there-atop (not shown). Alternately, as an example, channel openings 25 may stop atop or within the lowest second tier 20z. A reason for extending channel openings 25 at least to conductor material 17 of conductor tier 16 is to provide an anchoring effect to material that is within channel openings 25. Etch-stop material (not shown) may be within or atop conductor material 17 of conductor tier 16 to facilitate stopping of the etching of channel openings 25 relative to conductor tier 16 when such is desired. Such etch-stop material may be sacrificial or non-sacrificial.

Transistor channel material may be formed in the individual channel openings elevationally along the insulative tiers and the conductive tiers, thus comprising individual channel-material strings, which is directly electrically coupled with conductor material in the conductor tier. Individual memory cells of the example memory array being formed may comprise a gate region (e.g., a control-gate region) and a memory structure laterally-between the gate region and the channel material. In one such embodiment, the memory structure is formed to comprise a charge-blocking region, storage material (e.g., charge-storage material), and an insulative charge-passage material. The storage material (e.g., floating gate material such as doped or undoped silicon or charge-trapping material such as silicon nitride, metal dots, etc.) of the individual memory cells is elevationally along individual of the charge-blocking regions. The insulative charge-passage material (e.g., a band gap-engineered structure having nitrogen-containing material [e.g., silicon nitride] sandwiched between two insulator oxides [e.g., silicon dioxide]) is laterally-between the channel material and the storage material.

In one embodiment and as shown, charge-blocking material 30, storage material 32, and charge-passage material 34 have been formed in individual channel openings 25 elevationally along insulative tiers 20 and conductive tiers 22. Transistor materials 30, 32, and 34 (e.g., memory-cell materials) may be formed by, for example, deposition of respective thin layers thereof over stack 18\* and in individual openings 25 followed by planarizing such back at least to a top surface of stack 18\*.

Channel material 36 as a channel-material string 53 has also been formed in channel openings 25 elevationally along insulative tiers 20 and conductive tiers 22 in memory-block regions 58. Materials 30, 32, 34, and 36 are collectively shown as and only designated as material 37 in some figures due to scale. Example channel materials 36 include appropriately-doped crystalline semiconductor material, such as one or more silicon, germanium, and so-called III/V semiconductor materials (e.g., GaAs, InP, GaP, and GaN). Example thickness for each of materials 30, 32, 34, and 36 is 25 to 100 Angstroms. Punch etching may be conducted to remove materials 30, 32, and 34 from the bases of channel openings 25 (not shown) to expose conductor tier 16 such that channel material 36 is directly against conductor material 17 of conductor tier 16. Such punch etching may occur separately with respect to each of materials 30, 32, and 34 (as shown) or may occur with respect to only some (not shown). Alternately, and by way of example only, no punch etching may be conducted and channel material 36 may be directly electrically coupled to conductor material 17 of conductor tier 16 only by a separate conductive interconnect (not yet shown). A radially-central solid dielectric material 38 (e.g., spin-on-dielectric, silicon dioxide, and/or silicon nitride) is shown in channel openings 25. Alternately, and by way of example only, the radially-central portion in channel openings 25 may include void space(s) (not shown) and/or be devoid of solid material (not shown).

Horizontally-elongated second trenches 40 have been formed (e.g., by anisotropic etching) into stack 18\* through upper portion 18U to second sacrificial material 73 that is in first trenches 66 and are individually between immediately-laterally-adjacent memory-block regions 58. Ideally, second trenches 40 are narrower than second sacrificial material 73 in first trenches 66 and such material is used as an etch-stop for the etching of second trenches 40. An optional thin sacrificial liner 81 (e.g., hafnium oxide, aluminum oxide, multiple layers of the same or other materials, [e.g., silicon dioxide and silicon nitride] etc.) has then be formed in second trenches 40, followed by punch-etching there-through to expose second sacrificial material 73. Second trenches 40 may taper laterally-inward or laterally-outward moving deeper into stack 18* (not shown) and may extend into second sacrificial material 73 (not shown). By way of example and for brevity only, channel openings 25 are shown as being arranged in groups or columns of staggered rows of four and five channel openings 25 per row. Second trenches 40 will typically be wider than channel openings 25 (e.g., 2 to 5 times wider). Any alternate existing or future-developed arrangement and construction may be used. Second trenches 40 and channel openings 25 may be formed in any order relative the other or at the same time.

Figure 14:
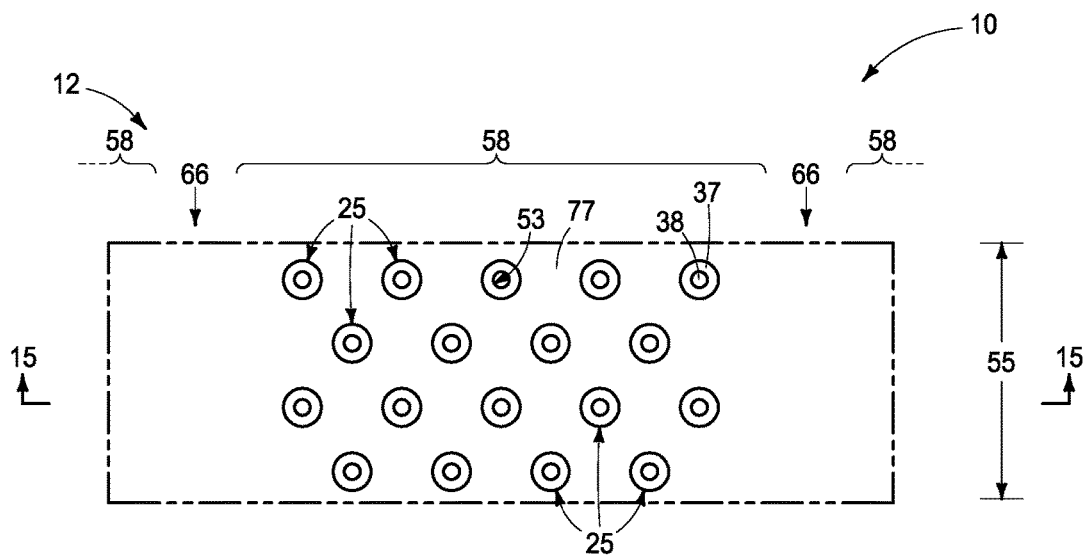
Figure 15:
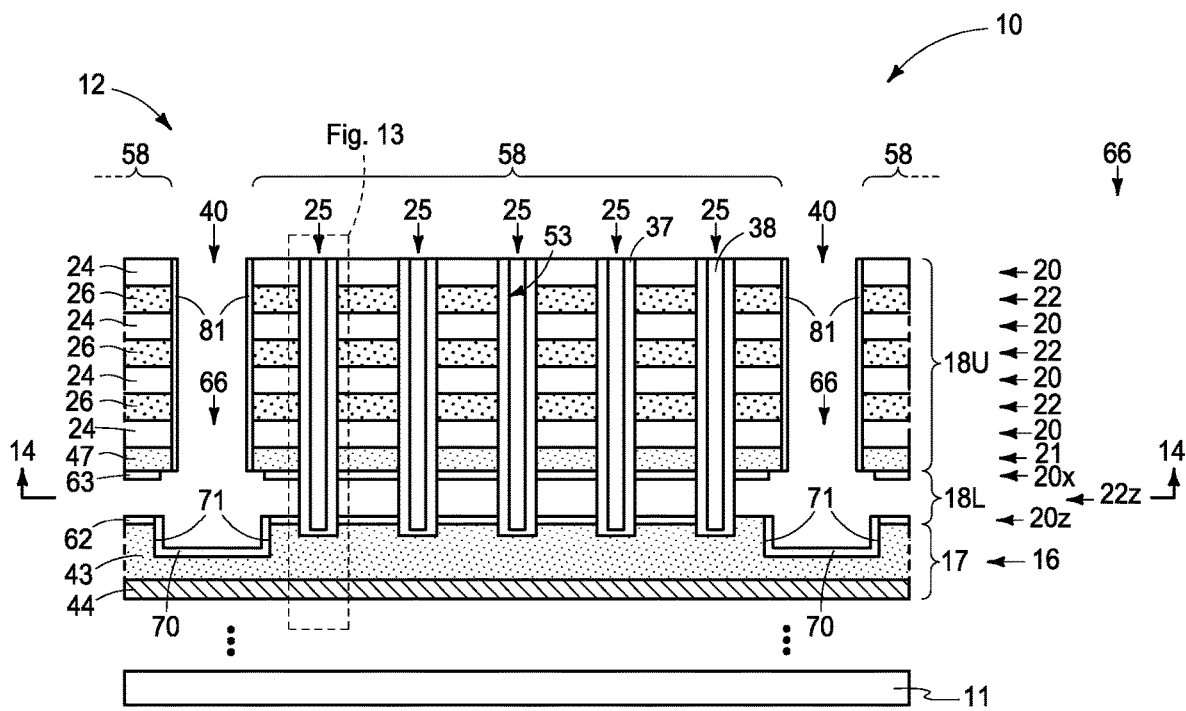

Referring to FIGS. 14 and 15, through first and second trenches 66 and 40, respectively, second sacrificial material 73 (not shown) and first sacrificial material 77 (not shown) have been isotropically etched selectively relative to silicon dioxide 74 that is over sidewalls 71 of first trenches 66 within conductor tier 16 (e.g., using an etching fluid comprising tetramethylammonium hydroxide [TMAH]). If silicon dioxide 74 (not shown) was previously formed over sidewalls 69 of first trenches 66 within lower first tier 22z, such would be removed (e.g., by isotropic etching using HF) prior to the isotropically etching of first sacrificial material 77 that is in lowest first tier 22z (and which would also remove some of silicon dioxide 70 that is over sidewalls 71 of first trenches 66 within conductor tier 16, such removing not being shown for simplicity and due to scale). The example etching is also shown as having been conducted selectively relative to materials 62 and 63.

Figure 16:
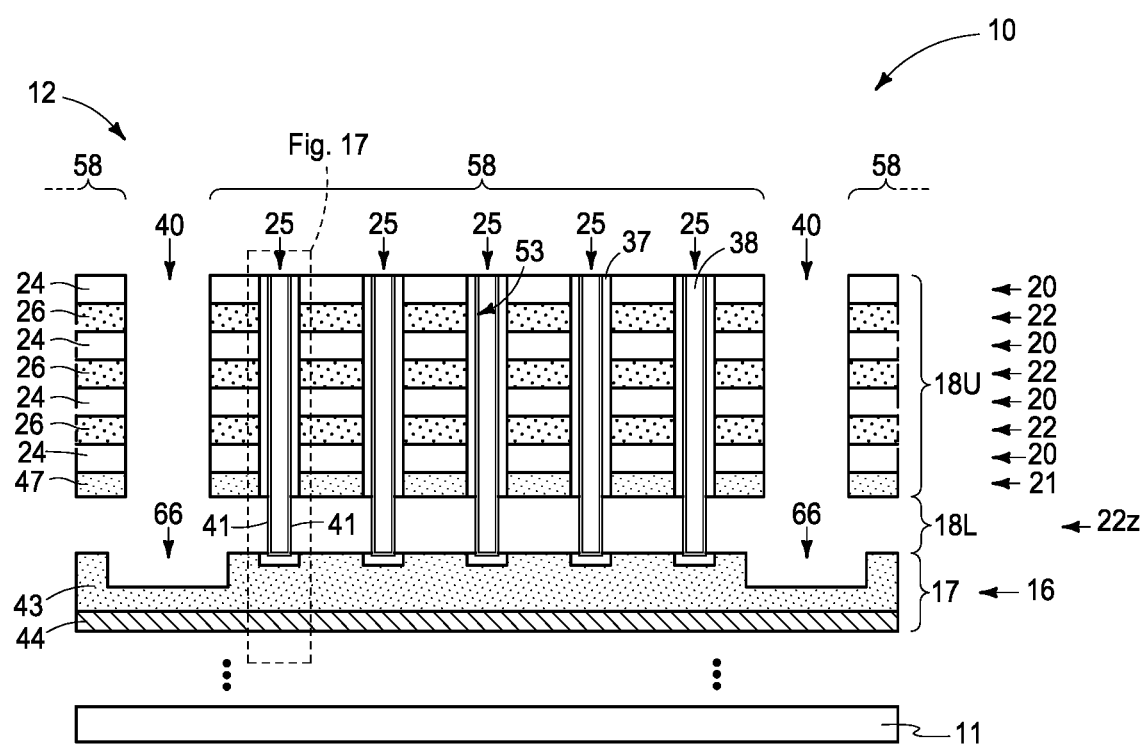
Figure 17:
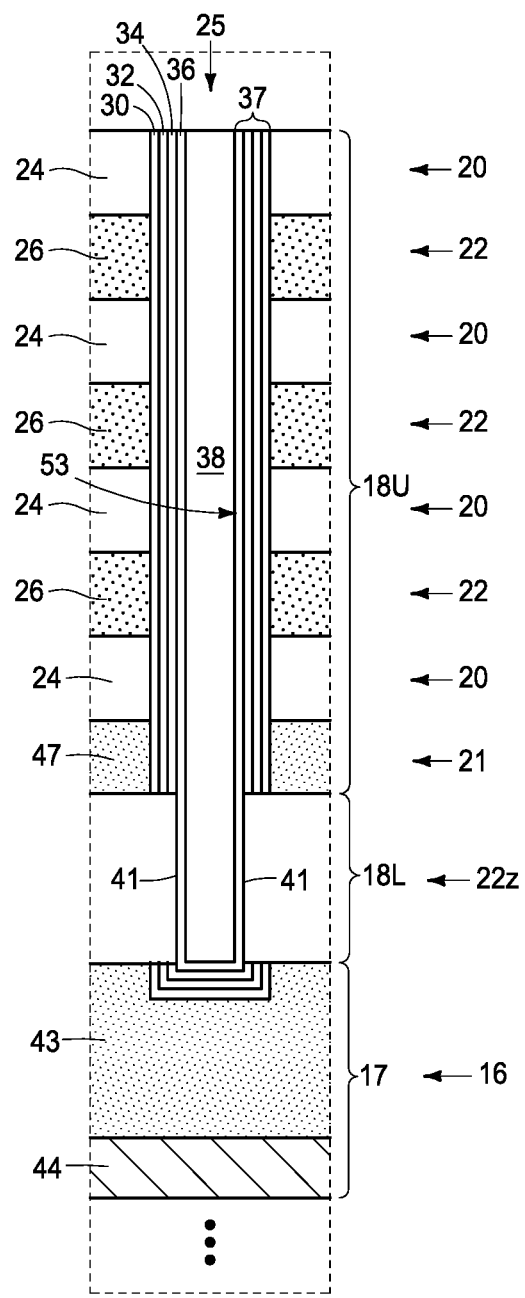

FIGS. 16 and 17 show example subsequent processing wherein, in one embodiment, material 30 (e.g., silicon dioxide), material 32 (e.g., silicon nitride), and material 34 (e.g., silicon dioxide or a combination of silicon dioxide and silicon nitride) have been etched in tier 22z to expose a sidewall 41 of channel material 36 of channel-material strings 53 in lowest first tier 22z. Any of materials 30, 32, and 34 in tier 22z may be considered as being sacrificial material therein. As an example, consider an embodiment where liner 81 (not shown) is one or more insulative oxides (other than solely silicon dioxide) and memory-cell materials 30, 32, and 34 individually are one or more of silicon dioxide and silicon nitride layers. In such example, the depicted construction can result by using modified or different chemistries for sequentially etching silicon dioxide and silicon nitride selectively relative to the other. As examples, a solution of 100:1 (by volume) water to HF will etch silicon dioxide selectively relative to silicon nitride, whereas a solution of 1000:1 (by volume) water to HF will etch silicon nitride selectively relative to silicon dioxide. Accordingly, and in such example, such etching chemistries can be used in an alternating manner where it is desired to achieve the example depicted construction. In one embodiment, such etching may be conducted selectively relative to liner 81 (when present, and liner 81 not being shown). In one embodiment and as shown, materials 62 and 63 (not shown) have been removed. When so removed, such may be removed when removing materials 30, 32, and 34, for example if materials 62 and 63 comprise one or both of silicon dioxide and silicon nitride. Alternately, when so removed, such may be removed separately (e.g., by isotropic etching). The artisan is capable of selecting other chemistries for etching other different materials where a construction as shown is desired. If liner 81 (not shown) comprises multiple layers of silicon dioxide and silicon nitride, such may be removed (e.g., by etching) commensurate with removal of materials 30, 32, 34, 62, and 63 where such collectively comprise silicon nitride and silicon dioxide.

Alternately, liner 81 may remain at this point of processing (not shown) or be separately or otherwise removed. Regardless, and in one embodiment as shown, all remaining of silicon dioxide 70 (not shown) resulting from the simultaneously exposing to oxidizing conditions has been removed (e.g., by the above isotropic HF etching for SiO$_2$). Alternately, silicon dioxide 70 (not shown) present in conductor tier 16 may remain at least at this point in processing and in one such embodiment in the finished-circuitry construction.

Figure 18:
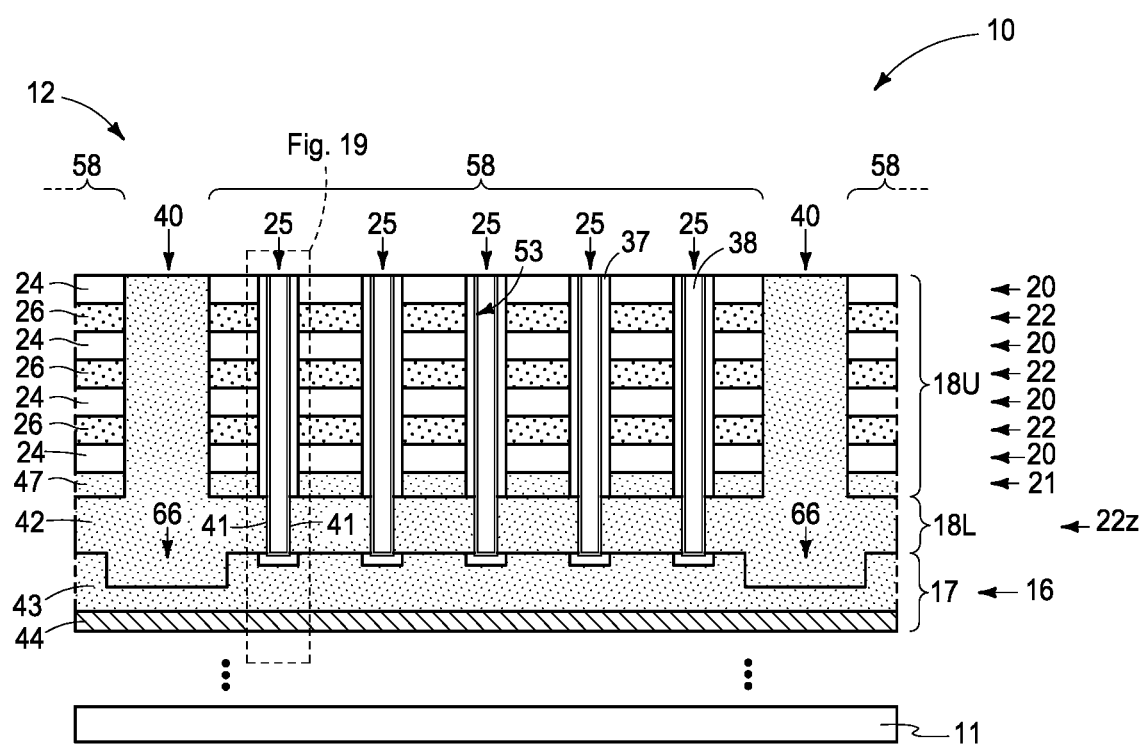
Figure 19:
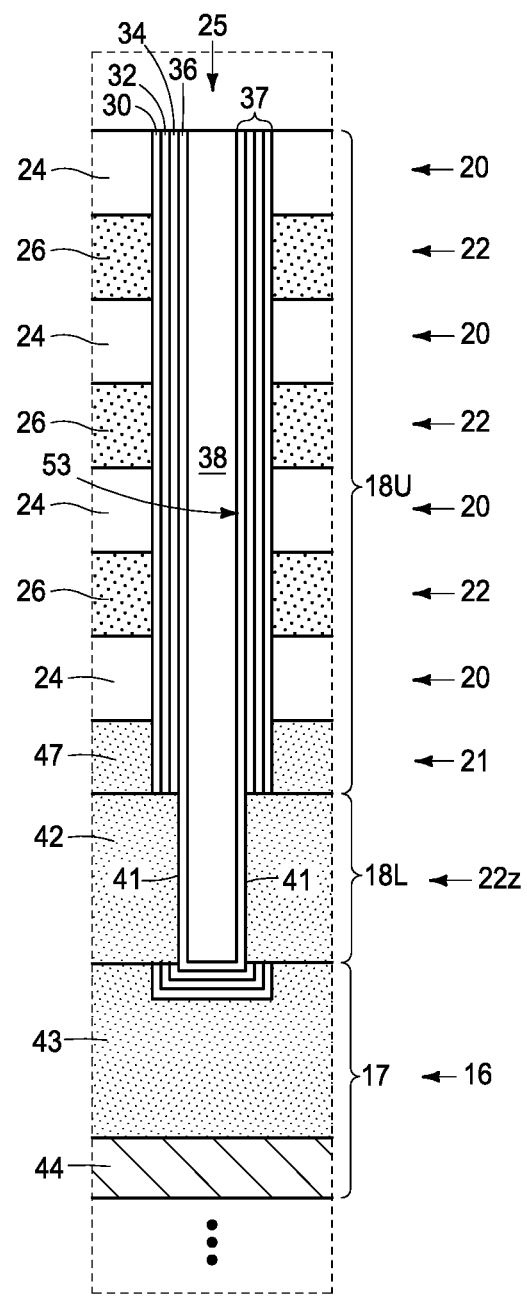

Referring to FIGS. 18 and 19, conductive material 42 (e.g., conductively-doped polysilicon) has been formed in lowest first tier 22z and directly electrically couples together channel material 36 of individual channel-material strings 53 and conductively-doped polysilicon 43 of conductor tier 16. That portion of conductive material 42 in first trenches 66 if remaining in the finished-circuitry construction becomes part of conductor material 17 of conductor tier 16. Conducting material 47 of tier 21 and conductive material 42 of tier 22z being directly against one another may collectively be considered as the lowest conductive tier at least in array region 12.

Figure 20:
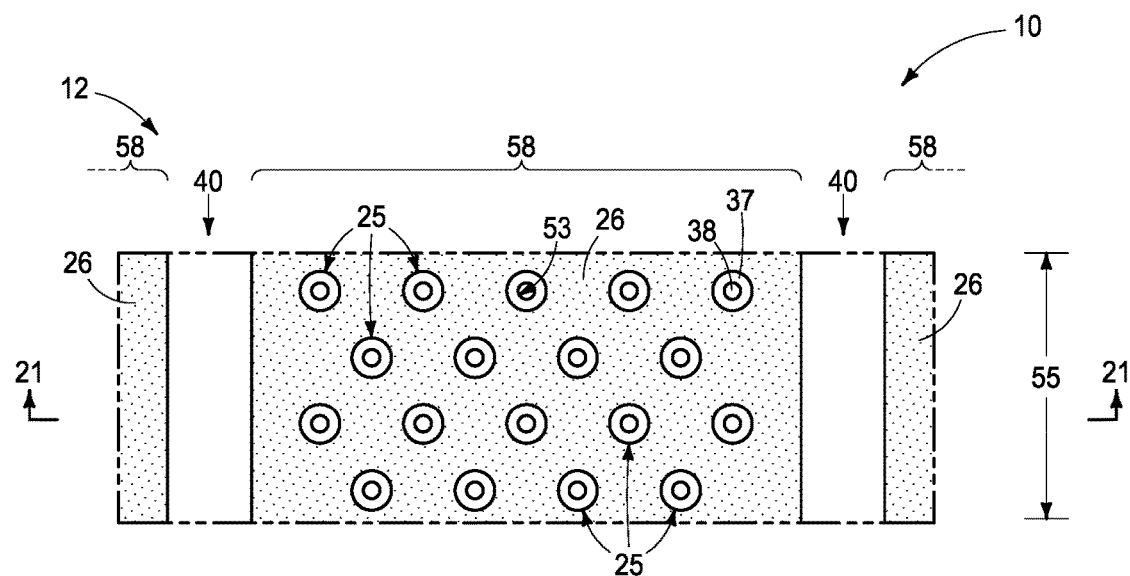
Figure 21:
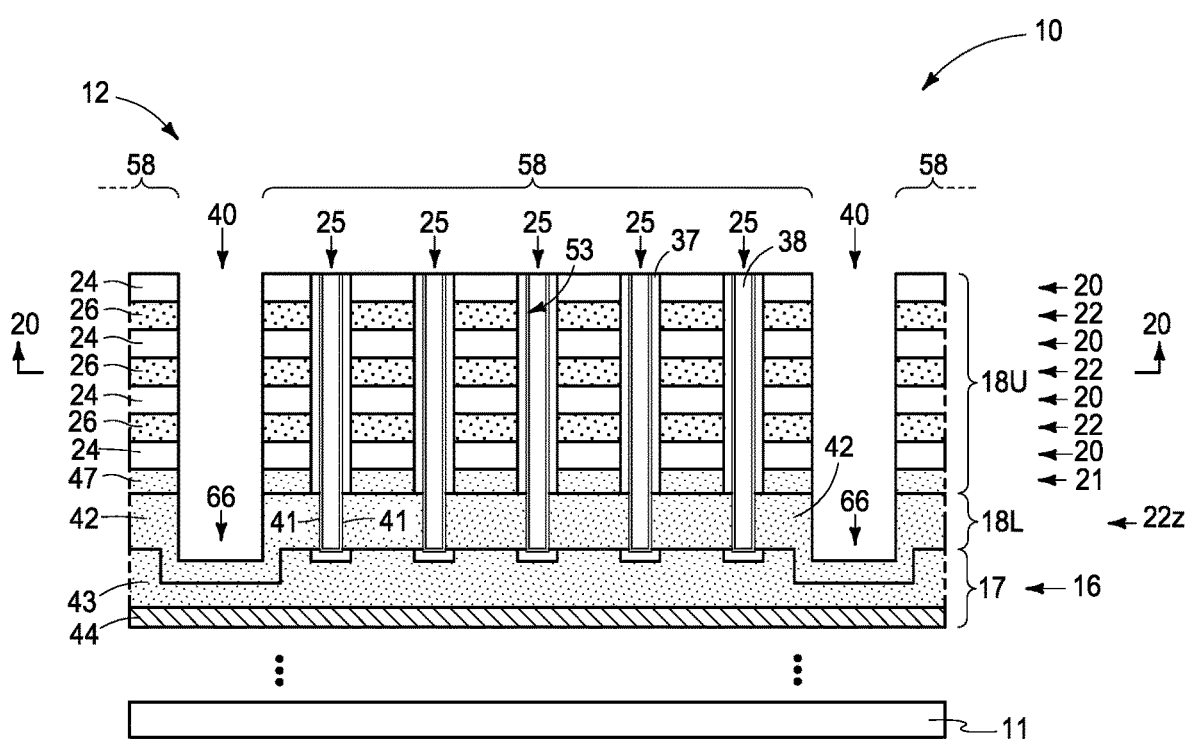
Figure 22:
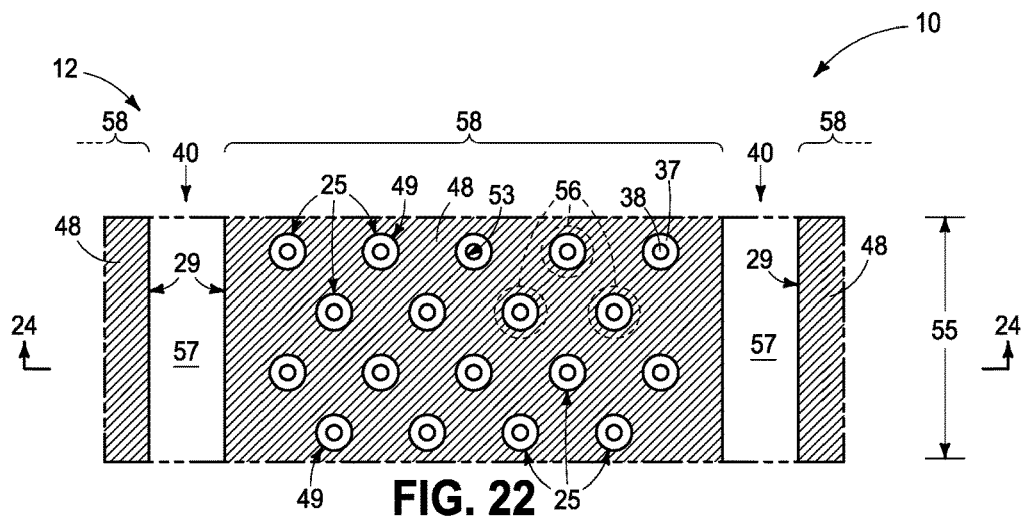

Referring to FIGS. 20 and 21, conductive material 42 has been removed from second trenches 40. Sacrificial liner 81 (when present; not shown) may be removed before or after forming conductive material 42 from second trenches 40. At least some of conductive material 42 if formed in first trenches 66 may be removed therefrom (as shown). Alternately, none of conductive material 42 if formed in first trenches 66 is removed therefrom (not shown).

Referring to FIGS. 22-28, material 26 (not shown) of conductive tiers 22 in array region 12 has been removed, for example by being isotropically etched away through second trenches 40 ideally selectively relative to the other exposed materials (e.g., using liquid or vapor H$_3$PO$_4$ as a primary etchant where material 26 is silicon nitride and other materials comprise one or more oxides or polysilicon). Material 26 in conductive tiers 22 in array region 12 in the example embodiment is sacrificial and has been replaced with conducting material 48, and which has thereafter been removed from second trenches 40, thus forming individual conductive lines 29 (e.g., wordlines) and elevationally-extending strings 49 of individual transistors and/or memory cells 56.

A thin insulative liner (e.g., Al$_2$O$_3$ and not shown) may be formed before forming conducting material 48. Approximate locations of some transistors and/or some memory cells 56 are indicated with a bracket or with dashed outlines, with transistors and/or memory cells 56 being essentially ring-like or annular in the depicted example. Alternately, transistors and/or memory cells 56 may not be completely encircling relative to individual channel openings 25 such that each channel opening 25 may have two or more elevationally-extending strings 49 (e.g., multiple transistors and/or memory cells about individual channel openings in individual conductive tiers with perhaps multiple wordlines per channel opening in individual conductive tiers, and not shown). Conducting material 48 may be considered as having terminal ends 50 corresponding to control-gate regions 52 of individual transistors and/or memory cells 56. Control-gate regions 52 in the depicted embodiment comprise individual portions of individual conductive lines 29. Materials 30, 32, and 34 may be considered as a memory structure 65 that is laterally between control-gate region 52 and channel material 36. In one embodiment and as shown with respect to the example "gate-last" processing, conducting material 48 of conductive tiers 22 is formed after forming openings 25 and/or second trenches 40. Alternately, the conducting material of the conductive tiers may be formed before forming channel openings 25 and/or second trenches 40 (not shown), for example with respect to "gate-first" processing.

A charge-blocking region (e.g., charge-blocking material 30) is between storage material 32 and individual control-gate regions 52. A charge block may have the following functions in a memory cell: In a program mode, the charge block may prevent charge carriers from passing out of the storage material (e.g., floating-gate material, charge-trapping material, etc.) toward the control gate, and in an erase mode the charge block may prevent charge carriers from flowing into the storage material from the control gate. Accordingly, a charge block may function to block charge migration between the control-gate region and the storage material of individual memory cells. An example charge-blocking region as shown comprises insulator material 30. By way of further examples, a charge-blocking region may comprise a laterally (e.g., radially) outer portion of the storage material (e.g., material 32) where such storage material is insulative (e.g., in the absence of any different-composition material between an insulative storage material 32 and conducting material 48). Regardless, as an additional example, an interface of a storage material and conductive material of a control gate may be sufficient to function as a charge-blocking region in the absence of any separate-composition-insulator material 30. Further, an interface of conducting material 48 with material 30 (when present) in combination with insulator material 30 may together function as a charge-blocking region, and as alternately or additionally may a laterally-outer region of an insulative storage material (e.g., a silicon nitride material 32). An example material 30 is one or more of silicon hafnium oxide and silicon dioxide.

Intervening material 57 has been formed in second trenches 40 and thereby laterally-between and longitudinally-along immediately-laterally-adjacent memory blocks 58. Intervening material 57 comprises insulating material (e.g., one or more of $SiO_2$, $Si_3N_4$, and $Al_2O_3$). In one embodiment and as shown, such insulating material extends downwardly into conductor tier 16. Intervening material 57 may include through array vias (not shown).

Figure 23:
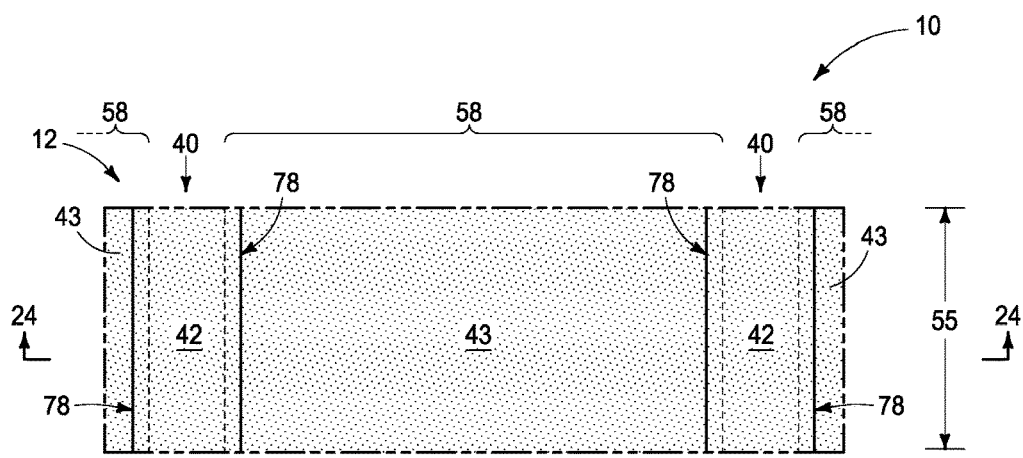
Figure 24:
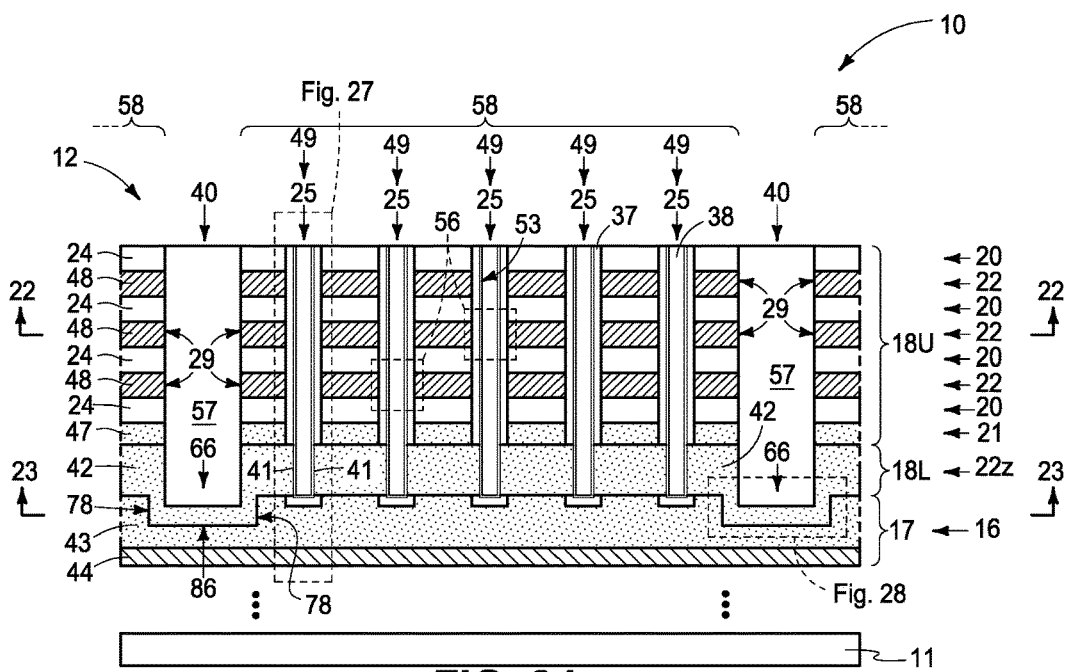
Figure 25:
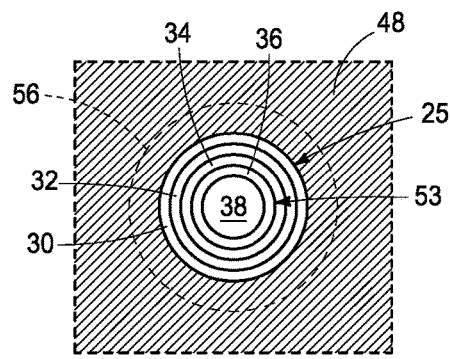
Figure 26:
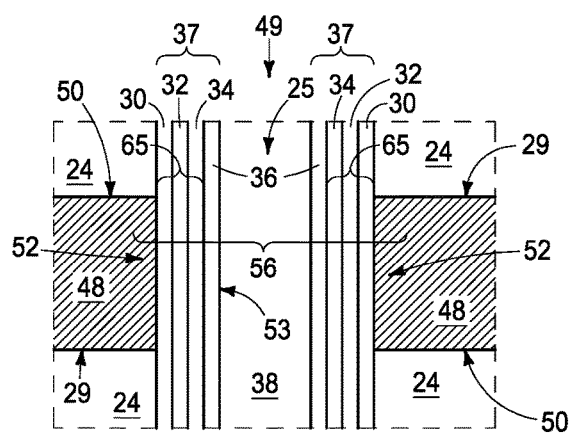
Figure 27:
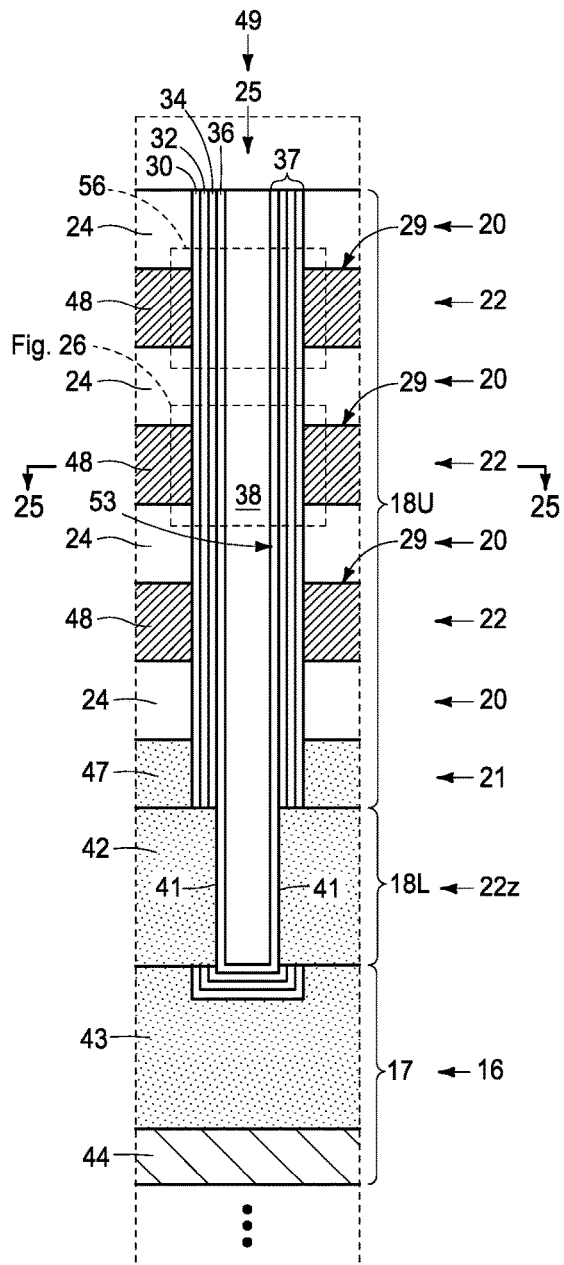
Figure 28:
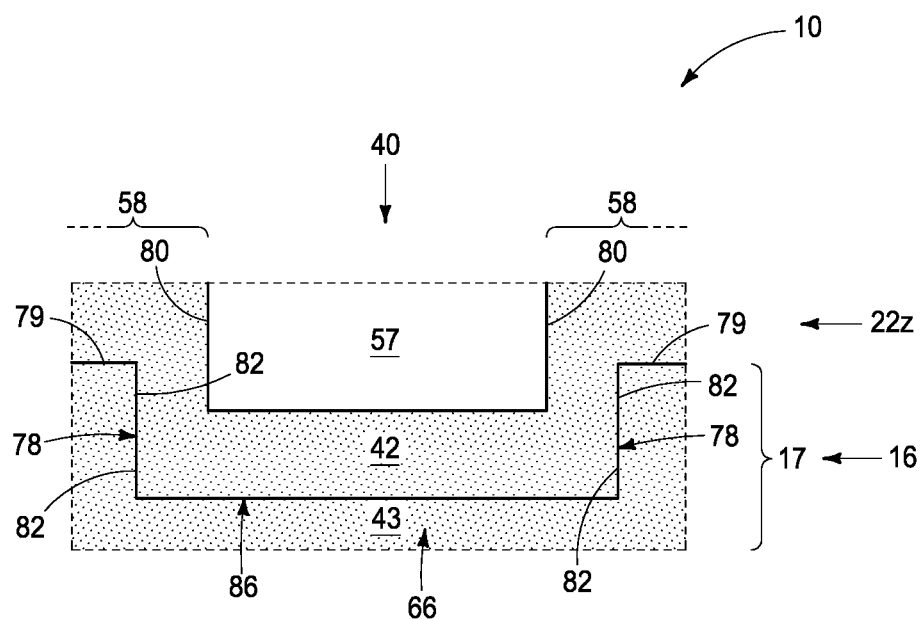
Figure 29:
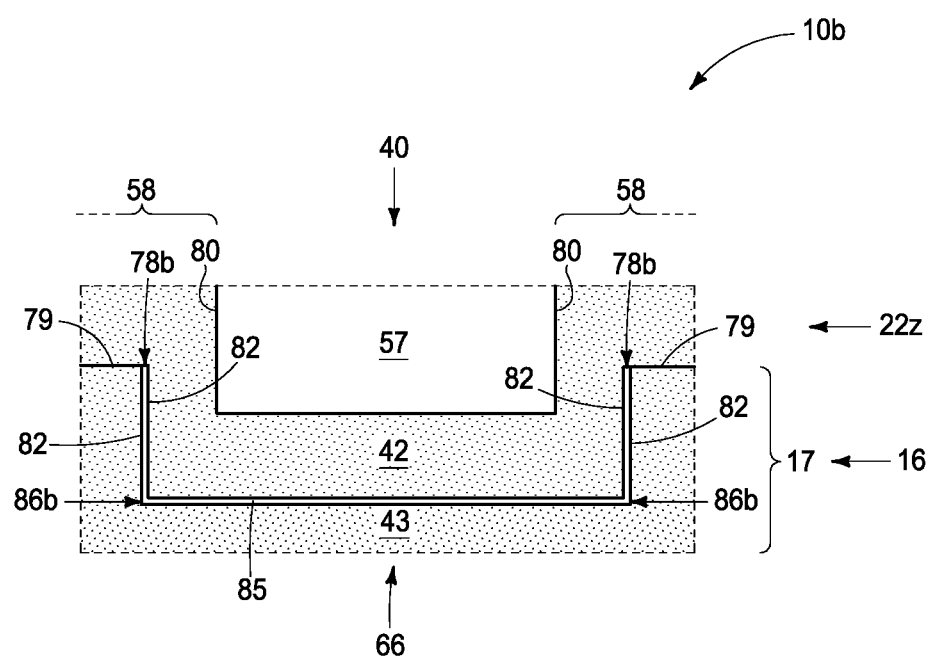

In one embodiment, conductor material 17 in conductor tier 16 in the finished-circuitry construction comprises a pair of side interfaces 78* that individually extend downwardly from a top 79 of conductor tier 16 on one of opposing sides 80 of intervening material 57 and individually extend longitudinally-along immediately-laterally-adjacent memory-block regions 58 (FIG. 23). Side interfaces 78* have conductor material 17 (e.g., 43 and 42) laterally-over opposing sides 82 thereof (FIG. 28). In one embodiment and as shown, side interfaces 78 individually comprise two same-composition conductor materials (e.g., 42 and 43) that are directly against one another. In one such embodiment, side interfaces 78 are devoid of silicon dioxide between said two same-composition conductor materials 43, 42 (e.g., n-type doped polysilicon). In an alternate embodiment construction 10b as shown in FIG. 29, side interfaces 78b individually comprise silicon dioxide 85 having a lateral thickness no greater than 15 Angstroms, and ideally no greater than 10 Angstroms (e.g., a native oxide that may unavoidably or otherwise be formed). Like numerals from the above-described embodiments have been used where appropriate, with some construction differences being indicated with the suffix "b" or with different numerals.

Side interfaces 78* may be continuous or discontinuous at some place(s) there-along. Side interfaces 78* will be continuous when conductor materials 42 and 43 are of different compositions relative one another. Side interface 78* may or may not be continuous when conductor materials 42 and 43 are of the same composition relative one another and continuously directly against one another. For example, separate-in-time formed conductor materials 42 and 43 of the same composition relative one another may nevertheless have a perceptible interface in a finished construction. Some of that interface may effectively disappear (i.e., not be perceptible) and some may remain perceptible whereby that interface is discontinuous in one or more locations there-along (e.g., as may occur by welding of the same-composition materials together due to subsequent heating during manufacture). When side interfaces 78* comprise a separate different-composition material there-between (e.g., 85 of interfaces 78b), side interface 78* may or may not be continuous when conductor materials 42 and 43 are of the same composition relative one another depending on whether that different-composition material is continuous there-between.

In one embodiment, a lower interface 86, 86b extends laterally-between pair of side interfaces 78 directly below intervening material 57 and extends longitudinally-along immediately-laterally-adjacent memory-block regions 58, with lower interface 86 having conductor material 17 (e.g., 43 and 42) directly above and directly below lower interface 86, 86b. In one embodiment, conductor material 17 (e.g., 43 and 42) in conductor tier 16 in the finished-circuitry construction comprises an interface 86, 86b that is directly below intervening material 57, that extends across and laterally-beyond two opposing sides 80 of intervening material 57, and that extends longitudinally-along immediately-laterally-adjacent memory-block regions 58 (regardless of presence of side interfaces 78). In such embodiment, lower interface 86, 86b has conductor material 17 (e.g., 43 and 42) directly there-above and directly there-below. Lower interface 86* may have any of the attributes described with respect to side interfaces 78* described in the immediately-preceding paragraph.

Any other attribute(s) or aspect(s) as shown and/or described herein with respect to other embodiments may be used.

Alternate embodiment constructions may result from method embodiments described above, or otherwise. Regardless, embodiments of the invention encompass memory arrays independent of method of manufacture. Nevertheless, such memory arrays may have any of the attributes as described herein in method embodiments. Likewise, the above-described method embodiments may incorporate, form, and/or have any of the attributes described with respect to device embodiments.

In one embodiment, a memory array (e.g., 12) comprising strings (e.g., 49) of memory cells (e.g., 56) comprises a conductor tier (e.g., 16) comprising conductor material (e.g., 17). The memory array comprises laterally-spaced memory blocks 58 individually comprising a vertical stack (e.g., 18*) comprising alternating insulative tiers (e.g., 20) and conductive tiers (e.g., 22) directly above the conductor tier. Channel-material strings (e.g., 53) of memory cells (e.g., 56) extend through the insulative tiers and the conductive tiers. The channel material (e.g., 36) of individual of the channel-material strings is directly electrically coupled to the conductor material of the conductor tier. Intervening material (e.g., 57) is laterally-between and longitudinally-along immediately-laterally-adjacent of the memory blocks. The intervening material comprises insulating material. The conductor material in the conductor tier comprises a pair of side interfaces (e.g., 78) that individually extend downwardly from a top (e.g., 79) of the conductor tier on one of opposing sides (e.g., 80) of the intervening material and individually extend longitudinally-along the immediately-laterally-adjacent memory blocks. The side interfaces have the conductor material laterally-over opposing sides (e.g., 82) thereof. Any other attribute(s) or aspect(s) as shown and/or described herein with respect to other embodiments may be used.

In one embodiment, a memory array (e.g., 12) comprising strings (e.g., 49) of memory cells (e.g., 56) comprises a conductor tier (e.g., 12) comprising conductor material (e.g., 17). The memory array includes laterally-spaced memory blocks (e.g., 58) individually comprising a vertical stack (e.g., 18*) comprising alternating insulative tiers (e.g., 20) and conductive tiers (e.g., 22) directly above the conductor tier. Channel-material strings (e.g., 53) of memory cells (e.g., 56) extend through the insulative tiers and the conductive tiers. The channel material (e.g., 36) of individual of the channel-material strings (e.g., 53) is directly electrically coupled to the conductor material of the conductor tier. Intervening material (e.g., 57) is laterally-between and longitudinally-along immediately-laterally-adjacent of the memory blocks. The intervening material comprising insulating material. The conductor material of the conductor tier comprises an interface (e.g., 86) that is directly below the intervening material, that extends across and laterally-beyond two opposing sides (e.g., 80) of the intervening material, and that extends longitudinally-along the immediately-laterally-adjacent memory blocks. The interface has the conductor material directly there-above and directly there-below. Any other attribute(s) or aspect(s) as shown and/or described herein with respect to other embodiments may be used.

A motivation, not a limitation, of the invention was to protect a polysilicon-comprising upper conductor material 43 from being etched by TMAH when etching a polysilicon-comprising sacrificial material 77 using TMAH as described above and as exemplified by FIGS. 14 and 15.

The above processing(s) or construction(s) may be considered as being relative to an array of components formed as or within a single stack or single deck of such components above or as part of an underlying base substrate (albeit, the single stack/deck may have multiple tiers). Control and/or other peripheral circuitry for operating or accessing such components within an array may also be formed anywhere as part of the finished construction, and in some embodiments may be under the array (e.g., CMOS under-array). Regardless, one or more additional such stack(s)/deck(s) may be provided or fabricated above and/or below that shown in the figures or described above. Further, the array(s) of components may be the same or different relative one another in different stacks/decks and different stacks/decks may be of the same thickness or of different thicknesses relative one another. Intervening structure may be provided between immediately-vertically-adjacent stacks/decks (e.g., additional circuitry and/or dielectric layers). Also, different stacks/decks may be electrically coupled relative one another. The multiple stacks/decks may be fabricated separately and sequentially (e.g., one atop another), or two or more stacks/decks may be fabricated at essentially the same time.

The assemblies and structures discussed above may be used in integrated circuits/circuitry and may be incorporated into electronic systems. Such electronic systems may be used in, for example, memory modules, device drivers, power modules, communication modems, processor modules, and application-specific modules, and may include multilayer, multichip modules. The electronic systems may be any of a broad range of systems, such as, for example, cameras, wireless devices, displays, chip sets, set top boxes, games, lighting, vehicles, clocks, televisions, cell phones, personal computers, automobiles, industrial control systems, aircraft, etc.

In this document unless otherwise indicated, "elevational", "higher", "upper", "lower", "top", "atop", "bottom", "above", "below", "under", "beneath", "up", and "down" are generally with reference to the vertical direction. "Horizontal" refers to a general direction (i.e., within 10 degrees) along a primary substrate surface and may be relative to which the substrate is processed during fabrication, and vertical is a direction generally orthogonal thereto. Reference to "exactly horizontal" is the direction along the primary substrate surface (i.e., no degrees there—from) and may be relative to which the substrate is processed during fabrication. Further, "vertical" and "horizontal" as used herein are generally perpendicular directions relative one another and independent of orientation of the substrate in three-dimensional space. Additionally, "elevationally-extending" and "extend(ing) elevationally" refer to a direction that is angled away by at least 45° from exactly horizontal. Further, "extend(ing) elevationally", "elevationally-extending", "extend(ing) horizontally", "horizontally-extending" and the like with respect to a field effect transistor are with reference to orientation of the transistor's channel length along which current flows in operation between the source/drain regions. For bipolar junction transistors, "extend(ing) elevationally" "elevationally-extending", "extend(ing) horizontally", "horizontally-extending" and the like, are with reference to orientation of the base length along which current flows in operation between the emitter and collector. In some embodiments, any component, feature, and/or region that extends elevationally extends vertically or within 10° of vertical.

Further, "directly above", "directly below", and "directly under" require at least some lateral overlap (i.e., horizontally) of two stated regions/materials/components relative one another. Also, use of "above" not preceded by "directly" only requires that some portion of the stated region/material/component that is above the other be elevationally outward of the other (i.e., independent of whether there is any lateral overlap of the two stated regions/materials/components). Analogously, use of "below" and "under" not preceded by "directly" only requires that some portion of the stated region/material/component that is below/under the other be elevationally inward of the other (i.e., independent of whether there is any lateral overlap of the two stated regions/materials/components).

Any of the materials, regions, and structures described herein may be homogenous or non-homogenous, and regardless may be continuous or discontinuous over any material which such overlie. Where one or more example composition(s) is/are provided for any material, that material may comprise, consist essentially of, or consist of such one or more composition(s). Further, unless otherwise stated, each material may be formed using any suitable existing or future-developed technique, with atomic layer deposition, chemical vapor deposition, physical vapor deposition, epitaxial growth, diffusion doping, and ion implanting being examples.

Additionally, "thickness" by itself (no preceding directional adjective) is defined as the mean straight-line distance through a given material or region perpendicularly from a closest surface of an immediately-adjacent material of different composition or of an immediately-adjacent region. Additionally, the various materials or regions described herein may be of substantially constant thickness or of variable thicknesses. If of variable thickness, thickness refers to average thickness unless otherwise indicated, and such material or region will have some minimum thickness and some maximum thickness due to the thickness being variable. As used herein, "different composition" only requires those portions of two stated materials or regions that may be directly against one another to be chemically and/or physically different, for example if such materials or regions are not homogenous. If the two stated materials or regions are not directly against one another, "different composition" only requires that those portions of the two stated materials or regions that are closest to one another be chemically and/or physically different if such materials or regions are not homogenous. In this document, a material, region, or structure is "directly against" another when there is at least some physical touching contact of the stated materials, regions, or structures relative one another. In contrast, "over", "on", "adjacent", "along", and "against" not preceded by "directly" encompass "directly against" as well as construction where intervening material(s), region(s), or structure(s) result(s) in no physical touching contact of the stated materials, regions, or structures relative one another.

Herein, regions-materials-components are "electrically coupled" relative one another if in normal operation electric current is capable of continuously flowing from one to the other and does so predominately by movement of subatomic positive and/or negative charges when such are sufficiently generated. Another electronic component may be between and electrically coupled to the regions-materials-components. In contrast, when regions-materials-components are referred to as being "directly electrically coupled", no intervening electronic component (e.g., no diode, transistor, resistor, transducer, switch, fuse, etc.) is between the directly electrically coupled regions-materials-components.

Any use of "row" and "column" in this document is for convenience in distinguishing one series or orientation of features from another series or orientation of features and along which components have been or may be formed. "Row" and "column" are used synonymously with respect to any series of regions, components, and/or features independent of function. Regardless, the rows may be straight and/or curved and/or parallel and/or not parallel relative one another, as may be the columns. Further, the rows and columns may intersect relative one another at 90° or at one or more other angles (i.e., other than the straight angle).

The composition of any of the conductive/conductor/conducting materials herein may be conductive metal material and/or conductively-doped semiconductive/semiconductor/semiconducting material. "Metal material" is any one or combination of an elemental metal, any mixture or alloy of two or more elemental metals, and any one or more metallic compound(s).

Herein, any use of "selective" as to etch, etching, removing, removal, depositing, forming, and/or formation is such an act of one stated material relative to another stated material(s) so acted upon at a rate of at least 2:1 by volume. Further, any use of selectively depositing, selectively growing, or selectively forming is depositing, growing, or forming one material relative to another stated material or materials at a rate of at least 2:1 by volume for at least the first 75 Angstroms of depositing, growing, or forming.

Unless otherwise indicated, use of "or" herein encompasses either and both.

CONCLUSION

In some embodiments, a method used in forming a memory array comprising strings of memory cells comprises forming a conductor tier comprising conductively-doped polysilicon on a substrate. A lower portion of a stack is formed that will comprise vertically-alternating first tiers and second tiers directly above the conductor tier. The stack comprises laterally-spaced memory-block regions. A lowest of the first tiers is in the lower portion and comprises first sacrificial material comprising polysilicon. Horizontally-elongated first trenches are formed through the lower portion and into the conductively-doped polysilicon of the conductor tier. The first trenches individually are between immediately-laterally-adjacent of the memory-block regions. The polysilicon of the first sacrificial material and the conductively-doped polysilicon of the conductor tier are simultaneously exposed to oxidizing conditions to form silicon dioxide over sidewalls of the first trenches within the conductor tier to a greater thickness than silicon dioxide, if any, that is formed over sidewalls of the first trenches within the lowest first tier. Second sacrificial material is formed in the first trenches over the silicon dioxide. The vertically-alternating first tiers and second tiers of an upper portion of the stack are formed directly above the lower portion and the second sacrificial material. Channel-material strings are formed that extend through the first tiers and the second tiers and into the first sacrificial material. Second horizontally-elongated trenches are formed through the upper portion to the second sacrificial material in the first trenches and that are between the immediately-laterally-adjacent memory-block regions. Through the first and second trenches, the first and second sacrificial materials are isotropically etched selectively relative to the silicon dioxide that is over the sidewalls of the first trenches within the conductor tier. After the isotropic etching, conductive material is formed in the lowest first tier that directly electrically couples together the channel material of individual of the channel-material strings and the conductively-doped polysilicon of the conductor tier.

In some embodiments, a memory array comprising strings of memory cells comprises a conductor tier comprising conductor material. Laterally-spaced memory blocks individually comprise a vertical stack comprising alternating insulative tiers and conductive tiers directly above the conductor tier. Channel-material strings of memory cells extend through the insulative tiers and the conductive tiers. The channel material of individual of the channel-material strings is directly electrically coupled to the conductor material of the conductor tier. Intervening material is laterally-between and longitudinally-along immediately-laterally-adjacent of the memory blocks. The intervening material comprises insulating material. The conductor material in the conductor tier comprises a pair of side interfaces that individually extend downwardly from a top of the conductor tier on one of opposing sides of the intervening material and individually extend longitudinally-along the immediately-laterally-adjacent memory blocks. The side interfaces have the conductor material laterally-over opposing sides thereof.

In some embodiments, a memory array comprising strings of memory cells comprises a conductor tier comprising conductor material. Laterally-spaced memory blocks individually comprise a vertical stack comprising alternating insulative tiers and conductive tiers directly above the conductor tier. Channel-material strings of memory cells extend through the insulative tiers and the conductive tiers. The channel material of individual of the channel-material strings is directly electrically coupled to the conductor material of the conductor tier. Intervening material is laterally-between and longitudinally-along immediately-laterally-adjacent of the memory blocks. The intervening material comprises insulating material. The conductor material of the conductor tier comprises an interface that is directly below the intervening material, that extends across and laterally-beyond two opposing sides of the intervening material, and that extends longitudinally-along the immediately-laterally-adjacent memory blocks. The interface has the conductor material directly there-above and directly there-below.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

The invention claimed is:

1. A method used in forming a memory array comprising strings of memory cells, comprising:
    forming a conductor tier comprising conductively-doped polysilicon on a substrate;
    forming a lower portion of a stack that will comprise vertically-alternating first tiers and second tiers directly above the conductor tier, the stack comprising laterally-spaced memory-block regions, a lowest of the first tiers being in the lower portion and comprising first sacrificial material comprising polysilicon;
    forming horizontally-elongated first trenches through the lower portion and into the conductively-doped polysilicon of the conductor tier, the first trenches individually being between immediately-laterally-adjacent of the memory-block regions;
    simultaneously exposing the polysilicon of the first sacrificial material and the conductively-doped polysilicon of the conductor tier to oxidizing conditions to form silicon dioxide over sidewalls of the first trenches within the conductor tier to a greater thickness than silicon dioxide, if any, that is formed over sidewalls of the first trenches within the lowest first tier;
    forming second sacrificial material in the first trenches over the silicon dioxide;
    forming the vertically-alternating first tiers and second tiers of an upper portion of the stack directly above the lower portion and the second sacrificial material, forming channel-material strings that extend through the first tiers and the second tiers and into the first sacrificial material, and forming second horizontally-elongated trenches through the upper portion to the second sacrificial material in the first trenches and that are between the immediately-laterally-adjacent memory-block regions;
    through the first and second trenches, isotropically etching the first and second sacrificial materials selectively relative to the silicon dioxide that is over the sidewalls of the first trenches within the conductor tier; and
    after the isotropically etching, forming conductive material in the lowest first tier that directly electrically couples together the channel material of individual of the channel-material strings and the conductively-doped polysilicon of the conductor tier.

2. The method of claim 1 wherein the simultaneously exposing doesn't form any silicon dioxide over the sidewalls of the first trenches within the lower first tier.

3. The method of claim 1 wherein the simultaneously exposing forms silicon dioxide over the sidewalls of the first trenches within the lower first tier and removing the silicon dioxide that is over the sidewalls of the first trenches within the lower first tier prior to the isotropically etching of the first sacrificial material that is in the lowest first tier.

4. The method of claim 1 wherein individual of the first trenches have a bottom in and comprising the conductively-doped polysilicon of the conductor tier, the exposing forming silicon dioxide all across the bottom of the first trenches.

5. The method of claim 1 wherein the isotropically etching comprises use of an etching fluid comprising tetramethylammonium hydroxide.

6. The method of claim 1 wherein the polysilicon of the first sacrificial material contains oxidation-inhibitor material therein at a total concentration of at least $1 \times 10^{12}$ atoms/cm$^3$ to 20 atomic percent; the oxidation-inhibitor material being at least one of N, C, Ga, B, O, Ge, As, Ti, W, Co, Mo, Hf, Zr, Ta, Ru, Cr, Ir, Pt, and P; the total concentration of the oxidation-inhibitor material in the polysilicon of the first sacrificial material being greater than a total concentration of the oxidation-inhibitor material, if any, in the conductively-doped polysilicon of the conductor tier.

7. The method of claim 6 wherein the total concentration of the oxidation-inhibitor material in the polysilicon of the first sacrificial material is at least 0.5 atomic percent.

8. The method of claim 7 wherein the total concentration of the oxidation-inhibitor material in the polysilicon of the first sacrificial material is at least 1.0 atomic percent.

9. The method of claim 8 wherein the total concentration of the oxidation-inhibitor material in the polysilicon of the first sacrificial material is no more than 5.0 atomic percent.

10. The method of claim 6 wherein the conductively-doped polysilicon is devoid of the oxidation-inhibitor material.

11. The method of claim 6 wherein the conductively-doped polysilicon comprises the oxidation-inhibitor material at least at $1 \times 10^{12}$ atoms/cm$^3$.

12. The method of claim 11 wherein conductivity-dopant in the conductively-doped polysilicon is P, the at least one in the first sacrificial material being devoid of P.

13. The method of claim 11 wherein the at least one is P and conductivity-dopant in the conductively-doped polysilicon is P.

14. The method of claim 6 wherein the at least one comprises N and/or C.

15. The method of claim 6 wherein the at least one is only one at least at $1 \times 10^{12}$ atoms/cm$^3$ and is devoid of all others of the at least one.

16. The method of claim 6 wherein the at least one is more than one at a respective concentration of at least $1 \times 10^{12}$ atoms/cm$^3$.

17. The method of claim 1 wherein the second sacrificial material and the first sacrificial material are of different compositions relative one another.

18. The method of claim 1 comprising removing all remaining of the silicon dioxide resulting from said simultaneously exposing before forming the conductive material in the lowest first tier.

19. The method of claim 1 comprising forming intervening material laterally-between and longitudinally-along immediately-laterally-adjacent of the memory-block regions after forming the conductive material in the lowest first tier, the intervening material comprising insulating material that extends downwardly into the conductor tier.

20. The method of claim 1 comprising forming intervening material laterally-between and longitudinally-along immediately-laterally-adjacent of the memory-block regions after forming the conductive material in the lowest first tier, the intervening material comprising insulating material; and the conductor material in the conductor tier in a finished-circuitry construction comprising a pair of side interfaces that individually extend downwardly from a top of the conductor tier on one of opposing sides of the intervening material and individually extend longitudinally-along the immediately-laterally-adjacent memory-block regions, the side interfaces having the conductor material laterally-over opposing sides thereof.

21. The method of claim 20 wherein the side interfaces individually comprise silicon dioxide having a lateral thickness no greater than 15 Angstroms.

22. The method of claim 20 wherein the side interfaces individually comprise two same-composition conductor materials that are directly against one another.

23. The method of claim 22 being devoid of silicon dioxide between said two same-composition conductor materials.

24. The method of claim 20 comprising a lower interface that extends laterally between the pair of side interfaces directly below the intervening material, and that extends longitudinally-along the immediately-laterally-adjacent memory-block regions, the lower interface having the conductor material directly above and directly below the lower interface.

25. The method of claim 1 comprising forming intervening material laterally-between and longitudinally-along immediately-laterally-adjacent of the memory-block region after forming the conductive material in the lowest first tier, the intervening material comprising insulating material; and the conductor material in the conductor tier in a finished-circuitry construction comprising an interface that is directly below the intervening material, that extends across and laterally-beyond two opposing sides of the intervening material, and that extends longitudinally-along the immediately-laterally-adjacent memory-block regions; the interface having the conductor material directly there-above and directly there-below.

* * * * *